United States Patent
Bogojeska et al.

(10) Patent No.: US 10,074,055 B2
(45) Date of Patent: Sep. 11, 2018

(54) ASSISTING DATABASE MANAGEMENT

(71) Applicant: International Business Machines Corporation, Armonk, NY (US)

(72) Inventors: Jasmina Bogojeska, Adliswil (CH); Ioana Giurgiu, Zurich (CH); George E. Stark, Austin, TX (US); Dorothea Wiesmann, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 14/812,069

(22) Filed: Jul. 29, 2015

(65) Prior Publication Data
US 2017/0032267 A1  Feb. 2, 2017

(51) Int. Cl.
G06F 17/30 (2006.01)
G06N 7/00 (2006.01)

(52) U.S. Cl.
CPC ....... G06N 7/005 (2013.01); G06F 17/30507 (2013.01)

(58) Field of Classification Search
CPC ............................................... G06F 17/30507
USPC .......................................................... 707/790
See application file for complete search history.

(56) References Cited

U.S. PATENT DOCUMENTS

| 8,200,659 B2 | 6/2012 | Zibitsker |
| 8,676,746 B2 | 3/2014 | Tsai et al. |
| 8,954,309 B2 * | 2/2015 | B'Far .................. G06F 11/302 703/13 |

(Continued)

FOREIGN PATENT DOCUMENTS

WO  2005116871 A1  12/2005

OTHER PUBLICATIONS

Chung et al., "Goal Oriented Dynamic Buffer Pool Management for Data Base Systems", CiteSeerX 5M, IBM Research Report RC19807, 1995, pp. 191-198, printed Jul. 16, 2015, <http://citeseerx.ist.psu.edu/viewdoc/summary?doi=10.1.1.46.916>.

(Continued)

*Primary Examiner* — Rehana Perveen
*Assistant Examiner* — Hicham Skhoun
(74) *Attorney, Agent, or Firm* — Christopher K. McLane; Maeve L. McCarthy

(57) ABSTRACT

In an approach to assisting database management, a computer generates one or more combinations of values of one or more database configuration parameters. The computer associates each of the one or more generated combinations of values with an incident probability. The computer defines relationships between the one or more generated combinations and the associated incident probabilities. The computer stores the defined relationships into an object representable as a multi-dimensional matrix, whose dimensions correspond to a plurality of database configuration parameters used to generate the combinations of values. The computer traverses the object to identify a path in the matrix. The computer returns the identified path for enabling subsequent interpretation thereof as a rule for passing from a first database configuration, corresponding to the first one of the one or more generated combinations, to a second database configuration, corresponding to the second one of the one or more generated combinations.

18 Claims, 4 Drawing Sheets

(56) References Cited

U.S. PATENT DOCUMENTS

2006/0074970 A1* 4/2006 Narayanan .......... G06F 11/3419
2007/0174335 A1* 7/2007 Konig ............... G06F 17/30306

OTHER PUBLICATIONS

Duan et al., "Tuning Database Configuration Parameters with iTuned", VLDB '09, Aug. 24-28, 2009, Lyon, France, Copyright 2009 VLDB Endowment, ACM, 12 pages.
Oh et al., "Resource Selection for Autonomic Database Tuning", Proceedings of the 21st International Conference on Data Engineering (ICDE '05), Apr. 5-8, 2005, © 2005, IEEE, 8 pages.
Storm et al., "Adaptive Self-Tuning Memory in DB2", VLDB '06, Sep. 12-15, 2006, Seoul, Korea, Copyright 2006 VLDB Endowment, ACM, pp. 1081-1092.

* cited by examiner

ASSISTING DATABASE MANAGEMENT

BACKGROUND OF THE INVENTION

The present invention relates generally to the field of database management, and more particularly to automatic or semi-automatic methods using statistical models to identify problematic database configurations.

Large information technology (IT) environments maintain hundreds of databases to support their business. Incidents associated with these databases result in losses of revenue, rework to recover and restore the data, and information loss that hurts business. In this context, problems inherent to database configurations are known to be challenging, owing to the large number of parameters involved (typically hundreds).

Solutions have been developed for self-optimizing/self-configuring Database Management Systems (DBMS s), which can be essentially classified into two categories, namely: the physical or logical tuning of DBMS s; and the tuning of database configuration parameters. In the context of physical or logical tuning, automatic index tuning has received most of the attention. In configuration parameter analysis, attempts have been made in finding optimal values for subsets of configuration parameters or even for only one configuration parameter.

SUMMARY

Embodiments of the present invention disclose a method, a computer program product, and a system for assisting database management. The method may include a computer generating one or more combinations of values of one or more database configuration parameters, wherein each of the one or more generated combinations of values is interpretable as a potential database configuration. The computer associates each of the one or more generated combinations of values with an incident probability, wherein the incident probability estimates a probability for each of the one or more generated combinations of values to lead to a database incident. The computer defines relationships between the one or more generated combinations of values and the associated incident probabilities. The computer stores the defined relationships into an object representable as a multi-dimensional matrix, whose dimensions correspond to a plurality of database configuration parameters used to generate the one or more combinations of values. The computer traverses the object to identify a path in the matrix, from a first one of the one or more generated combinations of values to a second one of the one or more generated combinations of values. The computer returns the identified path for enabling subsequent interpretation thereof as a rule for passing from a first database configuration, corresponding to the first one of the one or more generated combinations of values, to a second database configuration, corresponding to the second one of the one or more generated combinations of values.

DETAILED DESCRIPTION

The following description is structured as follows. First, general embodiments and high-level variants are described (Section 1). The next Section addresses more specific embodiments and technical implementation details (Section 2).

1. General Embodiments and High-Level Variants

Figure 1A:
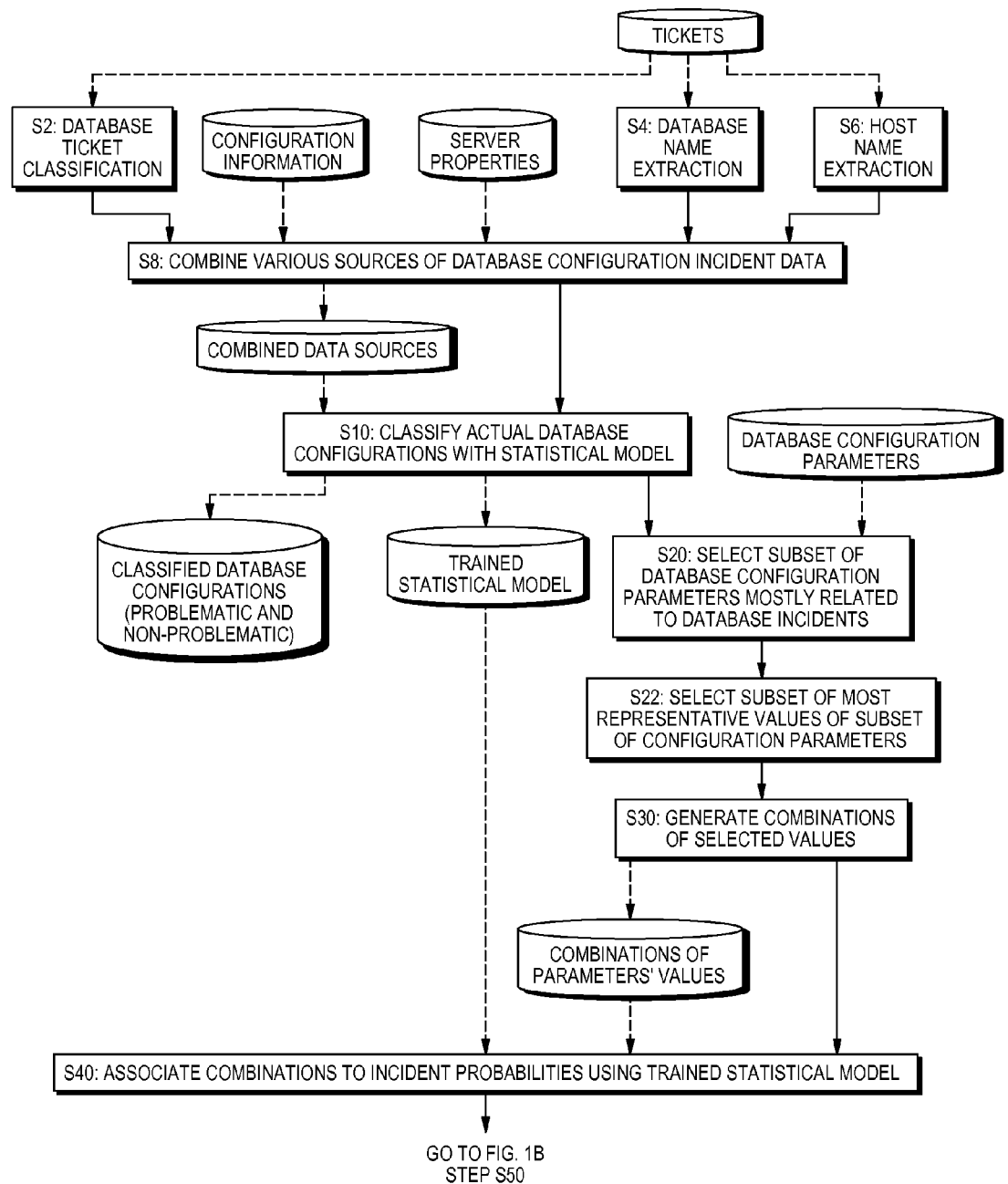
FIGS. 1A and 1B are a flowchart illustrating high-level steps of a computer-implemented method for database management assistance, in accordance with an embodiment of the present invention.
Figure 1B:
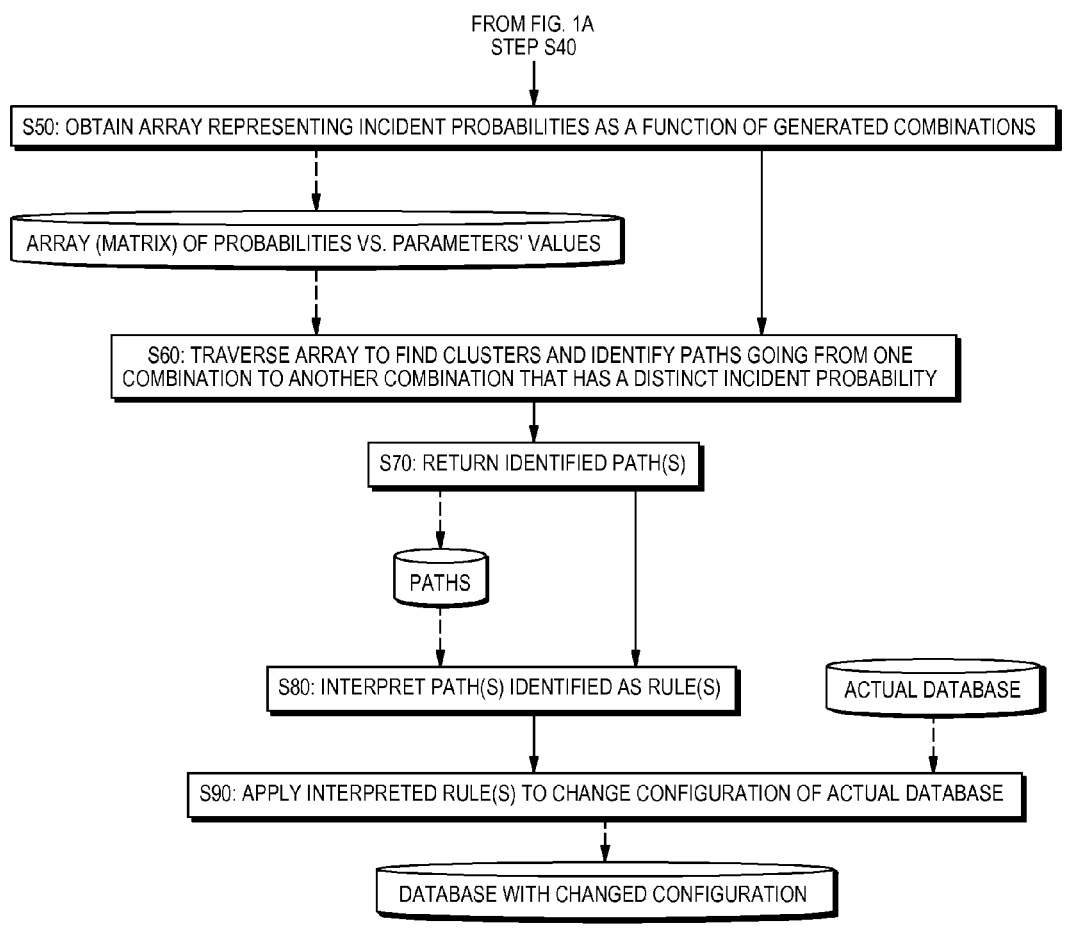
Figures 2, 3:
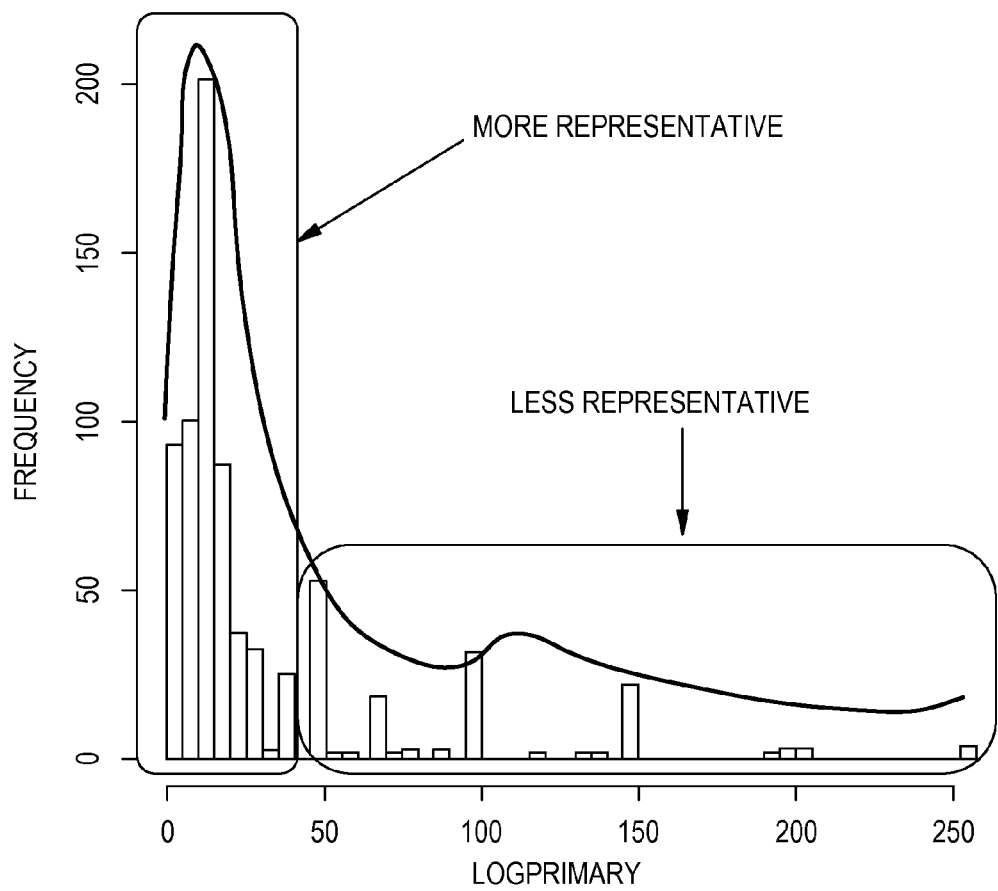
FIG. 2 is a simplified matrix representation of relationships between generated combinations of values of database configuration parameters and respectively associated incident probabilities, in accordance with an embodiment of the present invention.
FIG. 3 is a plot representing a partition of values taken by a given database configuration parameter, where the values are partitioned into two sets, in accordance with an embodiment of the present invention.

An aspect of the invention is first described in reference to FIGS. 1A, 1B, and 2, which concerns computer-implemented methods for assisting database management. Basically, such methods revolve around four main steps.

First, combinations of values P11 . . . P26 of database configuration parameters P1, P2 are generated (step S30, FIG. 1A). Each of the generated combinations is interpretable as a potential database configuration, as to be explained later in detail. FIG. 2 depicts a simple, pedagogical example involving combinations of two parameters P1 and P2, taking values {P11 . . . P18} and {P21 . . . P26}, respectively.

Second, each of the generated combinations is associated with an incident probability (step S40). The latter estimates a probability for each generated combination to lead to a database incident, or failure, or the like. The association performed at step S40 defines relationships between the generated combinations and the respectively associated incident probabilities. The defined relationships are then stored into an object (step S50, FIG. 1B), e.g., an array, which is representable as a multi-dimensional matrix, whose dimensions correspond to the number of database configuration parameters that have been used to generate the above combinations of values. In other words, this object represents incident probabilities as a function of the combinations. Note that steps S40 and S50 can be performed in a single step.

Third, the obtained object is traversed to identify a path (see e.g., p1, p2 in FIG. 2) going (i.e., in the matrix) from a first one of the generated combinations to a second one of the generated combinations, where the first and second combinations are associated with distinct incident probabilities (step S60).

Finally, the identified path p1, p2 can be returned (step S70) for enabling subsequent interpretation thereof as a rule (step S80) for passing from a first database configuration (corresponding to the first combination) to a second database configuration (corresponding to the second one of the combinations).

The steps S30, S40, S50, S60, and S70 can be regarded as a set of computerized operations (each performed via one or more processing elements, i.e., processors or the like), which allow the computer-implemented method to identify paths in the matrix, and, correspondingly, rules. The subsequent rules may notably be used to change and cure a defective configuration of an actual database.

Each combination of values generated may correspond to a potential database configuration, or a potential, partial database configuration if the combinations restrict to a limited set of parameters and possibly a restricted set of values thereof, as discussed below in detail.

The generated combinations of values are preferably associated to incident probabilities by using a statistical model of database configuration incidents, suitably applied to the set of combinations generated. This statistical model of database configuration incidents is typically a model trained during an earlier phase, using e.g., multivariate statistics or any other suited machine learning method. Present methods may otherwise import any ad hoc statistical model and apply it to combinations of database configuration parameters' values, to identify corresponding incident probabilities.

An incident probability is typically a probability estimated for a generated combination (which corresponds to a given, possibly partial, database configuration) to lead to a database incident, failure, malfunction, or the like. More generally, this probability can be regarded as a degree of a potential risk of incident, or failure, etc. An incident probability may for instance be a simple flag, indicative of a potential failure. In variants, an estimated incident probability can be nuanced by taking into account additional parameters, corrections, models, etc. Incident probabilities could, in general, take any value (but typically between 0 and 1). For practical applications, however, incident probabilities are preferably selected from a discrete set of values, to reduce complexity.

In a preferred embodiment, such probabilities are restricted to binary values, i.e., to a mere flag, for simplicity. In the embodiment, one of the two possible values of incident probabilities, e.g., 1, is indicative of a database configuration considered to potentially lead to a database incident, whereas the other value, e.g., 0, is indicative of a database configuration that is not considered to potentially lead to an incident. Note that one of the two values may be omitted, by default. For example, the value 0 could be omitted, if the database configurations tested are mostly non-problematic, such that only the problematic configurations may need to be explicitly stored or flagged in the object used to store the relationships.

In general, a discrete set of more than two values, e.g., $\{0, 0.5, 1\}$ or, continuous values of incident probabilities may be used, which allows the computer-implemented method to design more complex rules. For example, instead of searching a path leading to a straight 0 probability a more relaxed rule that aims at simply lowering an incident probability may be allowed. The more relaxed rule, however, may come at a higher computational cost.

The object stored can typically be represented as a multidimensional matrix whose dimensionality varies with the number of parameters taken into account, as illustrated in FIG. 2 (where only two parameters P1 and P2 were assumed, for simplicity). The object can for instance be stored as an array. It is hereafter often referred to as a matrix, for simplicity and without prejudice. Any suited algorithm may be contemplated to store, transform, or operate such a matrix, be it to save memory or accelerate processing or traversing of the matrix. Optimized, dedicated algorithms are nevertheless discussed in detail below, with reference to embodiments of the present invention, which allow optimally traversing (or, more generally, processing) the obtained matrix.

As discussed later in detail, clusters, or pockets, of matrix elements can be identified, to ease the subsequent identification of the paths. For example, clusters of contiguous matrix elements corresponding to combinations of parameters' values having the same or close incident probabilities will be identified, as illustrated in FIG. 2. Identifying clusters is advantageous inasmuch as it subsequently allows to ease the identification of paths going from one cluster to another. Note that only the problematic (or conversely the non-problematic) clusters may be effectively identified, especially if binary probabilities are used, as the remaining regions of the matrix shall implicitly correspond to the complementary clusters.

As illustrated in FIG. 2, path p1 going from a problematic combination (denoted by value "1") to a non-problematic combination ("0") may accordingly be obtained. Conversely, one may seek to identify path p2 going from non-problematic ("0") to problematic ("1") combinations. Note that present methods involve the identification of at least one path. Still, more likely, many paths will be identified in practice. The identified paths are eventually returned e.g., to a user or another program for subsequent interpretation into corresponding rules, and possibly for action, e.g., to implement a corresponding rule and solve an actual database incident.

Efficient approaches may be contemplated by using the identified clusters. In embodiments, present methods may be designed that can identify one or more clusters of contiguous matrix elements that are, each, associated with a same value of incident probability or, more generally, associated with a value of incident probability in a same given range. For example, said range may be a range of values less than 0.5, e.g., the range [0, 0.5]. Conversely, the range may be a range of values larger than 0.5, e.g., [0.5, 1.0]. Where binary probabilities (e.g., 0, 1) are used, the method looks for clusters of contiguous elements associated with a unique probability value, e.g., 0 or 1. The paths subsequently identified will originate from or point at one of the contiguous matrix elements of an identified cluster.

In embodiments, present methods may be devised that can identify a set of two distinct clusters (each comprising contiguous matrix elements), where of the two distinct clusters are associated with distinct ranges of incident probabilities (or with distinct values of incident probabilities where binary probabilities are used). The two clusters identified may be contiguous. In a preferred embodiment, present methods can maximize the sizes of the clusters when trying to identify them, as described with respect to Section 2.

Paths p1 and p2 subsequently identified may extend, each, from a matrix element of a first one of the two clusters, up to a matrix element of the second one of the two clusters in that case, as illustrated in FIG. 2.

The paths (and thus the corresponding rules) identified may typically extend from a combination associated to a high incident probability to a combination having a low incident probability, for example, when trying to identify a rule for solving a database incident. Yet, the identified paths may point at combinations of high incident probability, for example, when trying to identify forbidden transitions.

The methods described above may advantageously be used to modify the configuration of an actual database (step S90, FIG. 1B), i.e., according to a rule corresponding to a returned path, and this, in order to change said configuration and thereby solve a database incident by creating a database with a changed configuration.

As illustrated in FIG. 1A, in embodiments, a subset of database configuration parameters may be selected from a given, initial set of database configuration parameters (step S20, prior to step S30, generating the combinations). The selected subset of configuration parameters may pertain to parameters that are mostly related to database incidents, e.g., according to a statistical model. In addition, the values of the selected parameters may be restricted to a subset of the most representative values thereof (step S22), i.e., values that are driving or highly correlated with one or more database incidents. Thus, the subsequent generation of the combinations (step S30) may be restricted to the sole subset of most representative values of the sole selected subset of configuration parameters. In variants, the parameter values may be restricted (to the most representative values only), but without restricting the set of parameters. In other variants, the parameter set may be restricted, without necessarily restricting their values. In other words, the database configuration parameters and/or values thereof may be restricted to subsets thereof. In general, the required computational effort is reduced. The computational costs can be reduced when restricting both the parameters and their values. A suitably trained statistical model may, for instance, be used to discard parameters that are statistically irrelevant to database incidents. Known sampling methods may be used to discard irrelevant or rare parameters' values. FIG. 3 illustrates this in respect of a typical database configuration parameter ("Log primary"). This is discussed in detail in Section 2.1. One having skill in the art understands that tests have shown that most database incidents can still be solved even when using a restricted set of parameters/values. In practice, selecting between ten and twenty parameters and approximately ten values thereof turns out to be most satisfactory.

Actual database configurations may be classified by making use of a statistical model, based on actual database configuration incident data (step S10). The statistical model used for classifying actual database configurations may actually be trained while classifying database configurations. The same model is preferably subsequently used for associating the generated combinations to incident probabilities, as discussed with respect to step S40. In embodiments of the present invention, various statistical models may be used, in addition to reusing the trained statistical model.

The database configurations are preferably classified at step S10 consistently with the probability scheme used throughout steps S40, S50, and S60. In particular, one may preferably classify databases into problematic database configurations or non-problematic database configurations, if a binary probability scheme is to be used.

Prior to step S10, one may combine different sources of database configuration incident data (step S8), such as tickets for server incidents, server properties, database properties (including both static and dynamic information), and database configuration information, in order to obtain the database configuration incident data. Prior to step S8, various processing may be performed to query the different sources of database configuration information from submitted tickets, such as database ticket classification (step S2), database name extraction (step S4), and host name extraction (step S6).

Figure 4:
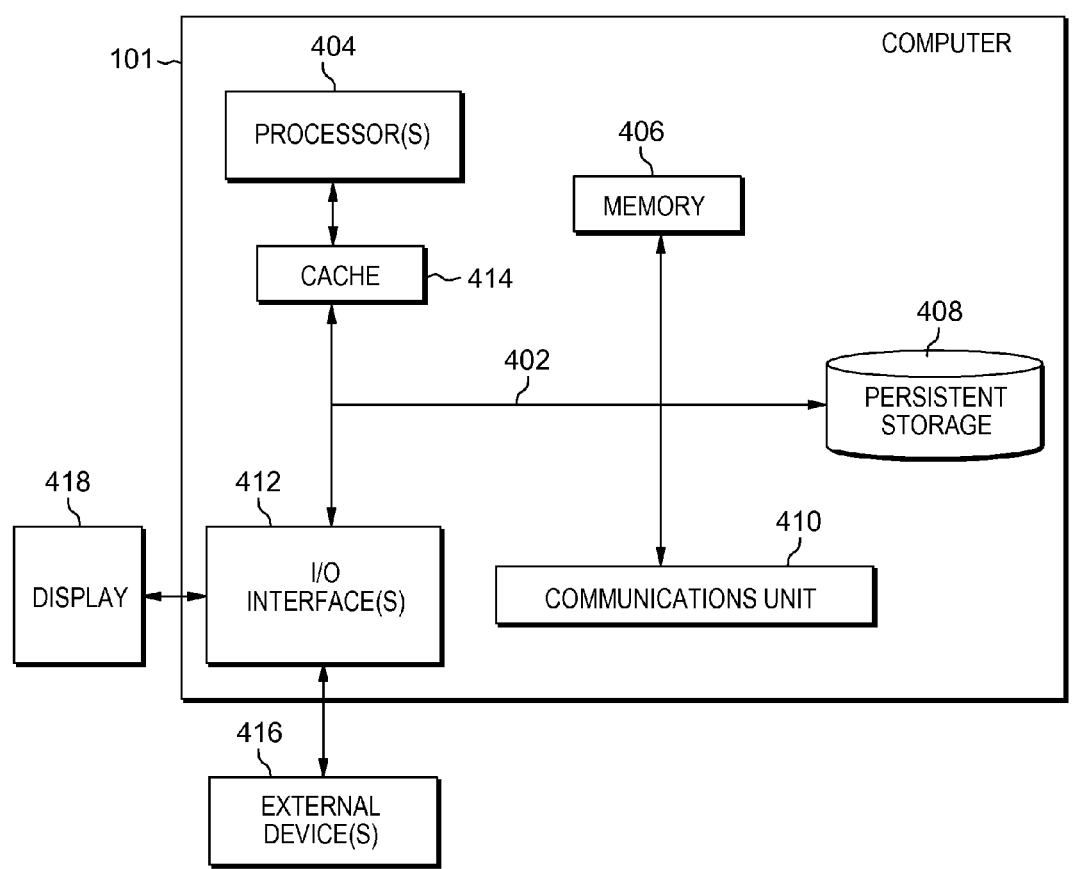
FIG. 4 depicts a block diagram of components of a computer executing the database management assistance method of FIGS. 1A and 1B, in accordance with an embodiment of the present invention.

According to another aspect, the invention can be embodied as a computerized system 100, as illustrated in FIG. 4. Such a system typically comprising a processing unit and a memory. The latter typically comprises computerized methods, which are configured, upon execution by the processing unit, for implementing steps of methods as described in reference to FIG. 1A, 1B, or 2. Similarly, and according to still another aspect, the invention can be embodied as a computer program product.

The above embodiments have been succinctly described in reference to the accompanying drawings and may accommodate a number of variants. Several combinations of the above features may be contemplated, as illustrated in the next Section.

2. Specific Embodiments/Technical Implementation Details 2.1 Examples of Specific Embodiments The specific embodiment discussed in this Section takes advantage of the database isolation to identify high risk enterprise relational database management systems (DBMS) and their causes by: 1) using a statistical model to identify key incident drivers out of a large possible space; 2) identifying best combination of driver values to minimize risk of incidents; and 3) recommending optimal configuration and actions for expert review.

In a first step, historical data are collected from production IT environments, regarding their database systems. More specifically, the method collects database incidents, server properties, as well as database properties. The database properties comprise static information (e.g., database version) and dynamic information (e.g., database size, detailed workload and configuration parameters).

In a second step, the method applies a multivariate statistical analysis (e.g., using a random forest algorithm) to classify an IT environment's databases into problematic and non-problematic. The criteria for classification may, for instance, be taken as follows: any database associated with more than one database incident over the span of twelve months is classified as problematic.

The next steps are to identify those configuration parameters that are driving or highly correlated with database incidents and suggest database reconfigurations that are likely to lead to no or few database incidents in the future.

In a third step, the method selects the top K configuration parameters, where K is a positive integer, and creates a simulation grid based on their sampled values. The method obtains many combinations of configurations, which are input to the statistical model to predict whether each configuration is problematic or not. Then, from what the model outputs, in a fourth step, the method identifies the top N best and top M worst configurations, where N and M are positive integers. In a fifth step, the method analyzes the configurations to identify trends per each configuration parameter or good/poor performance clusters around specific configuration parameter values. To tackle this problem, the method uses an algorithm for efficient grid traveling. Finally, findings regarding configuration to be avoided and configuration to be applied are presented to experts and validated based on the experts' expertise. The experts' feedback is then incorporated into the statistical model for further refinement.

Sampling of most representative values of configuration parameter is now described with reference to FIG. 3. After selecting the top K most important parameters (based on output from the multivariate analysis model and, if necessary, expert knowledge), for each parameter the method samples its most representative values. This step is advantageous since most configuration parameters have large ranges of values (e.g., from one to five million) and therefore simulating configurations for every possible combinations of values would be computationally very expensive. The sampling can be done by discretizing the parameter ranges through frequency histograms after building the histogram of values encountered in the initial data set for each selected parameter. Then, the method may split the range into discretized bins that have an equal number of observations and sample equally from each bin. This ensures that the more representative ranges are better represented in the final set of samples. In the example of FIG. 3, more values from the range 0 to 45 are sampled than from the range of 45 to 250, since there are a higher occurrence of lower values in the initial set. On average, the number of samples to be collected may be set to ten for each parameter.

Finally, possible algorithms for cluster identification and rule extraction are discussed. The algorithm is typically run twice, i.e., a first time to extract the rules for problematic configurations and a second time for non-problematic configurations. Note that these configurations have been obtained in a previous step by running the multivariate analysis model on the simulated configurations (with sampled values per top K parameters).

If only two parameters were to be considered in the configurations (as illustrated in FIG. 2), then the rules extraction implies detecting maximal rectangles in a two dimensional space. For three parameters, this implies the detection of maximal parallelepipeds in a three dimensional space. However, the analysis becomes more complicated beyond three parameters. Typically, between ten and twenty parameters are considered in each configuration, therefore rules are extracted from spaces that may have more than ten dimensions.

To approach the problem, one may use similar concepts as the concepts of "join" and "merge" from databases. Join is a complex intersection operation, whereas merge is a complex union operation. The resulting algorithm is based on the parameter ordering, therefore rules are extracted starting from the first most important parameter (K=1) and continue to the last, as illustrated below:

1. For each parameter k (k goes from 1 to K), we find the maximal range (problematic or non-problematic) through either:
   a. Merging, if for all parameters k+1 to K their respective ranges match in that their lowest and highest values match; or
   b. Joining (intersecting), by extracting the common range for the considered parameters and then performing range splits for all configurations where the range does not match the join range.
2. This algorithm is applied recursively, until all merges and all joins have been executed.

The merge operation takes precedence over the join, since the goal is to obtain rules that are as general or inclusive as possible, therefore larger ranges associated to problematic or non-problematic are preferred. The output of the algorithm is an interval tree, where each level represents a parameter and its ranges (associated to problematic or non-problematic).

2.2 Computerized Systems

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

FIG. 4 depicts a block diagram of components of computerized unit 101, e.g., a general-purpose computer, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computerized unit 101 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 of computerized unit 101 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 of computerized unit 101 through communications unit 410.

I/O interface(s) 412 allows for input and output of data with other devices that may be connected to computerized unit 101. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention on computerized unit 101 can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

2.3 Computer Program Products

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method for assisting database management, the method comprising:
   Generating, via one or more processing elements, one or more combinations of values of one or more database configuration parameters, wherein each of the one or more generated combinations of values is interpretable as a potential database configuration;
   associating, via the one or more processing elements, each of the one or more generated combinations of values with an incident probability, wherein the incident probability estimates a probability for each of the one or more generated combinations of values to lead to a database incident and wherein the incident probability associated with a first one of the one or more generated combinations of values is higher than the incident probability associated to a second one of the one or more generated combinations of values;
   Defining, via the one or more processing elements, relationships between the one or more generated combinations of values and the associated incident probabilities;
   storing, via the one or more processing elements, the defined relationships into an object representable as a multi-dimensional matrix, whose dimensions correspond to a plurality of database configuration parameters used to generate the one or more combinations of values;
   traversing, via the one or more processing elements, the object to identify a path in the matrix, from the first one of the one or more generated combinations of values to the second one of the one or more generated combinations of values, wherein traversing the object further comprises: identifying, via the one or more processing elements, in the object, two distinct clusters of contiguous matrix elements, such that two distinct clusters are associated with distinct ranges of incident probabilities, or with distinct values of incident probabilities; and identifying, via the one or more processing elements, one or more paths, each of the identified paths going from a matrix element of a first one of the two distinct clusters to a matrix element of a second one of the two distinct clusters; and
   Returning, via the one or more processing elements, the identified path for enabling subsequent interpretation thereof as a rule for passing from a first database configuration, corresponding to the first one of the one or more generated combinations of values, to a second database configuration, corresponding to the second one of the one or more generated combinations of values.

2. The method of claim 1, wherein traversing the object further comprises: identifying, via the one or more processing elements, in the object, a cluster of contiguous matrix elements that are associated to a value of incident probability in a same given range, or with a same value of incident probability, wherein, the identified path originates from or points at one of the contiguous matrix elements.

3. The method of claim 1, wherein identifying the two distinct clusters maximizes a size of each of the two distinct clusters.

4. The method of claim 3, wherein the identified two distinct clusters are contiguous in the matrix.

5. The method of claim 1, further comprising, modifying, via the one or more processing elements, a configuration of an actual database according to a rule corresponding to a returned path.

6. The method of claim 1, wherein associating each of the one or more generated combinations of values to an incident probability further comprises applying, via the one or more processing elements, a statistical model of database configuration incidents to the one or more generated combinations of values.

7. The method of claim 6, wherein applying the statistical model to the one or more generated combinations of values associates each of the one or more generated combinations of values to an incident probability selected from a discrete set of incident probabilities.

8. The method of claim 6, wherein applying the statistical model to the one or more generated combinations of values associates each of the one or more generated combinations of values to an incident probability selected from two incident probabilities.

9. The method of claim 1, further comprising, prior to generating the one or more combinations: selecting, via the one or more processing elements, from a set of one or more database configuration parameters, a subset of database configuration parameters that are related to database incidents; and generating, via the one or more processing elements, the set of one or more combinations using the selected subset of one or more database configuration parameters as database configuration parameters.

10. The method of claim 1, further comprising, prior to generating the one or more combinations: selecting, via the one or more processing elements, a subset of most representative values for each of the database configuration parameters; and generating, via the one or more processing elements, the one or more combinations using the selected subset of most representative values of the database configuration parameters.

11. The method of claim 1, further comprising, prior to generating the one or more combinations: selecting, via the one or more processing elements, from a set of database configuration parameters a subset of database configuration parameters that are related to database incidents; and for each parameter of the selected subset, selecting, via the one or more processing elements, a subset of most representative values thereof, wherein, generating the one or more combinations of values comprises generating combinations of values of the selected subset of most representative values of the sole parameters of said subset of database configuration parameters.

12. The method of claim 1, further comprising, prior to generating the combinations of values, classifying, via the one or more processing elements, one or more actual database configurations by making use of a statistical model, wherein the statistical model is based on actual database configuration incident data.

13. The method of claim 12, wherein the statistical model used for classifying the one or more actual database configurations is trained while classifying the one or more actual database configurations and is subsequently used for associating each of the generated combinations of values to an incident probability.

14. The method of claim 12, wherein each of the one or more actual database configurations is classified as a problematic database configuration or a non-problematic database configuration.

15. The method of claim 12, further comprising, prior to classifying, combining, via the one or more processing elements, a plurality of different sources of database configuration incident data to obtain the database configuration incident data.

16. A computer program product for assisting database management, the computer program product comprising: one or more computer readable storage device and program instructions stored on the one or more computer readable storage device, the stored program instructions comprising:
Program instructions to generate one or more combinations of values of one or more database configuration parameters, wherein each of the one or more generated combinations of values is interpretable as a potential database configuration;
program instructions to associate each of the one or more generated combinations of values with an incident probability, wherein the incident probability estimates a probability for each of the one or more generated combinations of values to lead to a database incident and wherein the incident probability associated with a first one of the one or more generated combinations of values is higher than the incident probability associated to a second one of the one or more generated combinations of values;
program instructions to define relationships between the one or more generated combinations of values and the associated incident probabilities;
program instructions to store the defined relationships into an object representable as a multi-dimensional matrix, whose dimensions correspond to a plurality of database configuration parameters used to generate the one or more combinations of values;
program instructions to traverse the object to identify a path in the matrix, from the first one of the one or more generated combinations of values to the second one of the one or more generated combinations of values, wherein traversing the object further comprises identifying, in the object, two distinct clusters of contiguous matrix elements, such that two distinct clusters are associated with distinct ranges of incident probabilities, or with distinct values of incident probabilities; and identifying, via the one or more processing elements, one or more paths, each of the identified paths going from a matrix element of a first one of the two distinct clusters to a matrix element of a second one of the two distinct clusters; and
program instructions to return the identified path for enabling subsequent interpretation thereof as a rule for passing from a first database configuration, corresponding to the first one of the one or more generated combinations of values, to a second database configuration, corresponding to the second one of the one or more generated combinations of values.

17. The computer program product of claim 16, further comprising, modifying, via the one or more processing elements, a configuration of an actual database according to a rule corresponding to a returned path.

18. A computer system for assisting database management, the computer system comprising:
one or more computer processors;
one or more computer readable storage device;
program instructions stored on the one or more computer readable storage device for execution by at least one of the one or more computer processors, the stored program instructions comprising:
program instructions to generate one or more combinations of values of one or more database configuration parameters, wherein each of the one or more generated combinations of values is interpretable as a potential database configuration;
program instructions to associate each of the one or more generated combinations of values with an incident probability, wherein the incident probability estimates a probability for each of the one or more generated combinations of values to lead to a database incident and wherein the incident probability associated with a first one of the one or more generated combinations of values is higher than the incident probability associated to a second one of the one or more generated combinations of values;
program instructions to define relationships between the one or more generated combinations of values and the associated incident probabilities;
program instructions to store the defined relationships into an object representable as a multi-dimensional matrix, whose dimensions correspond to a plurality of database configuration parameters used to generate the one or more combinations of values;

program instructions to traverse the object to identify a path in the matrix, from the first one of the one or more generated combinations of values to the second one of the one or more generated combinations of values, wherein traversing the object further comprises identifying, in the object, two distinct clusters of contiguous matrix elements, such that two distinct clusters are associated with distinct ranges of incident probabilities, or with distinct values of incident probabilities; and identifying, via the one or more processing elements, one or more paths, each of the identified paths going from a matrix element of a first one of the two distinct clusters to a matrix element of a second one of the two distinct clusters; and program instructions to return the identified path for enabling subsequent interpretation thereof as a rule for passing from a first database configuration, corresponding to the first one of the one or more generated combinations of values, to a second database configuration, corresponding to the second one of the one or more generated combinations of values.

* * * * *